United States Patent [19]

Nagashima

[11] Patent Number: 4,939,047
[45] Date of Patent: Jul. 3, 1990

[54] MOLDED SADDLE FOR STORAGE BATTERY PLATES, STORAGE BATTERY CONTAINER, AND STORAGE BATTERY

[75] Inventor: Takashi Nagashima, Imaichi, Japan

[73] Assignee: Furukawa Denchi Kabushiki Kaisha, Kanagawa, Japan

[21] Appl. No.: 305,682

[22] Filed: Feb. 3, 1989

[30] Foreign Application Priority Data

Feb. 29, 1988 [JP] Japan .................................. 26810[U]

[51] Int. Cl.⁵ ............................................. H01M 2/10
[52] U.S. Cl. ......................................... 429/66; 429/186
[58] Field of Search ........................... 429/66, 186, 208

[56] References Cited

U.S. PATENT DOCUMENTS

| | | | |
|---|---|---|---|
| 2,257,489 | 9/1941 | Wells | 429/186 |
| 2,470,163 | 5/1949 | Gray | 429/186 |
| 4,455,356 | 6/1984 | Barrett | 429/66 |

FOREIGN PATENT DOCUMENTS

| | | | |
|---|---|---|---|
| 368826 | 3/1949 | Japan . | |
| 51-150639 | 12/1976 | Japan . | |
| 0022605 | of 1900 | United Kingdom | 429/186 |
| 0236316 | 7/1925 | United Kingdom | 429/186 |

Primary Examiner—Donald L. Walton
Attorney, Agent, or Firm—Armstrong, Nikaido, Marmelstein, Kubovcik & Murray

[57] ABSTRACT

A molded saddle for an electrode plate of a battery having a horizontal base plate and a flexible raised support plate portion for supporting legs of positive plates. When the molded saddle is attached to the inner bottom surface of a battery container, a large vertical space between an upper end portion of the flexible raised support plate portion and the inner surface of the bottom of the container is provided so that when the positive plate of a plate assembly is extended, the flexible, raised support portion supporting the positive plate is pushed in order to be lowered by the extension of the positive plate so as to absorb the extension resulting in the prevention of the positive plate from being warped.

4 Claims, 5 Drawing Sheets

MOLDED SADDLE FOR STORAGE BATTERY PLATES, STORAGE BATTERY CONTAINER, AND STORAGE BATTERY

BACKGROUND OF THE INVENTION

1. Field of the Invention

This invention generally relates to a molded saddle for electrode plates. More particularly, this invention relates to a molded saddle for electrode plates of a stationary sealed type lead acid storage battery, a storage battery container, and a storage battery.

2. Description of the Relevant Art

There has been known a molded saddle which is manufactured as a separate part of a battery container. The molded saddle is made into a sectionally mountain-shaped support portion and is attached to the inner bottom surface of a battery container for supporting legs of positive or negative electrode plates of a storage battery.

The just-mentioned sectionally mountain-shaped saddles which are carried by the battery container of a conventional storage battery are effective for supporting the negative and positive electrodes plates with the mountain-shaped portions thereof. However, when the positive electrode plates extend or expand, they cannot absorb the extensions of the positive electrode plates at all or, if so, only insufficiently. Consequently, the positive plates become gradually warped with the lapse of time resulting in such inconveniences as falling off from the active material, and further resulting in insufficient contact with the retainer of the separator which, in turn, causes the capacity of the battery to decrease. At worst conditions, the positive electrode plate extensions push up against the strap interconnecting the taps of the positive plates which, in turn, push up against the terminal-sealing portion resulting in the damage of that portion.

SUMMARY OF THE INVENTION

The object of this invention is to provide a molded saddle for supporting storage battery plates.

It is another object of this invention to provide a molded saddle for supporting storage battery plates which absorbs the extensions of the positive plates, and overcomes the above-mentioned defects of the conventional saddle, and prolongs the service life of a storage battery.

In accordance with one embodiment of this invention, a molded saddle for supporting storage battery plates comprises a horizontal base plate, and a flexible raised support plate portion for supporting legs of positive plates. The flexible raised support plate portion rises up from one end of the base plate to be fixedly attached to the inner bottom surface of a battery container and so formed as to have a large vertical space between its upper end portion and a horizontal plane with respect to the horizontal base plate.

When the molded saddle for storage battery plates according to this invention is fixedly attached to the inner bottom surface of a battery container by adhering the horizontal base plate to the bottom surface of the container, there is a storage battery container made according to the present invention which results in a large vertical space remaining between the flexible raised support plate portion and the inner bottom surface of the battery container. Consequently, when the positive plates which are supported on the flexible raised support plate portion extend, the flexible raised support plate portion subsequently moves downwards in order to absorb the extension of the positive plates completely. Thus, the increased extension of the positive plate, with the lapse of time, can be absorbed well by the flexible raised support portion of the molded saddle of this invention; thereby, remarkably prolonging the battery life.

Furthermore, when the other end of the horizontal base plate is extended in order to have a sectionally mountain-shaped negative plate support plate portion formed integrally with the molded saddle for supporting legs of positive plates, a molded saddle is disposed at a predetermined position of the bottom surface of the battery container for automatically supporting negative plates when the molded saddle for supporting the positive plates is attached at a predetermined position to the inner bottom surface of the battery container. Further, the battery container has a flexible, raised support plate portion of the positive plate-supporting molded saddle disposed in the battery container in such a manner that the legs of positive plates in a plate assembly placed in the battery container may be supported. Thus, when a point biased toward one side of the lower end surface of each of said legs, or when a storage battery is arranged so that the upper end portion of the flexible, raised support plate portion of the positive plate-supporting molded saddle is fitted into an engaging groove provided in the lower end surface of each positive plate's leg, the flexible, raised support plate portion can keep the positive plate supported in a more stable and secured fashion when the flexible raised support plate portion bends downwards and absorbs the positive plate extension.

The foregoing and other objects, features and advantages of this invention will be apparent from the following, more particular, description of the preferred embodiments of this invention, as illustrated in the accompanying drawings.

DETAILED DESCRIPTION OF THE PREFERRED EMBODIMENTS

Figure 1:
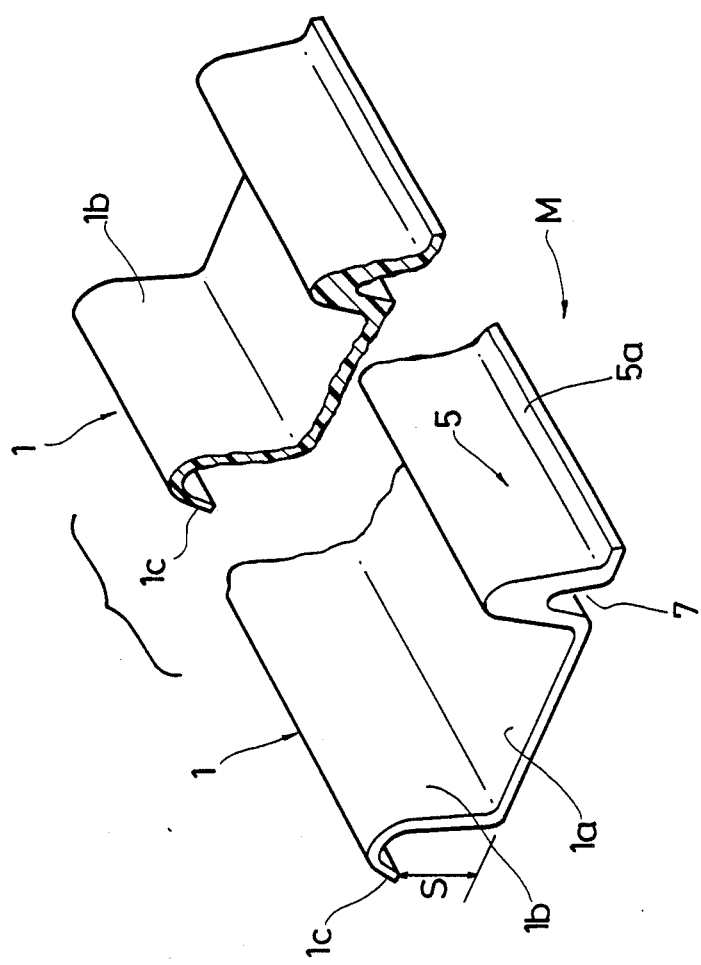
FIG. 1 is a perspective view, partly omitted, of one embodiment of a molded saddle for storage battery plates according to this invention.

Referring to FIG. 1 reference numeral 1 generally denotes a molded saddle for supporting positive plates of a storage battery according to one embodiment of the present invention. The molded saddle 1 is made up of an integrally formed structure having a horizontal base plate 1a which is to be securely attached to the inner bottom surface of a battery container, and a flexible, raised support plate portion 1b for supporting legs of positive electrode plates of a battery. The support plate portion is formed by extending one end of the horizontal base plate portion 1a so as to rise substantially upright and leave a large vertical space S between the upper end of the extension and the horizontal base plate which is to be attached to the inner bottom surface of a battery container. It is preferred that the molded saddle be formed longitudinally so that the legs of the positive plates which are lined up in the longitudinal direction of a plate assembly may be mounted thereon.

Figure 2:
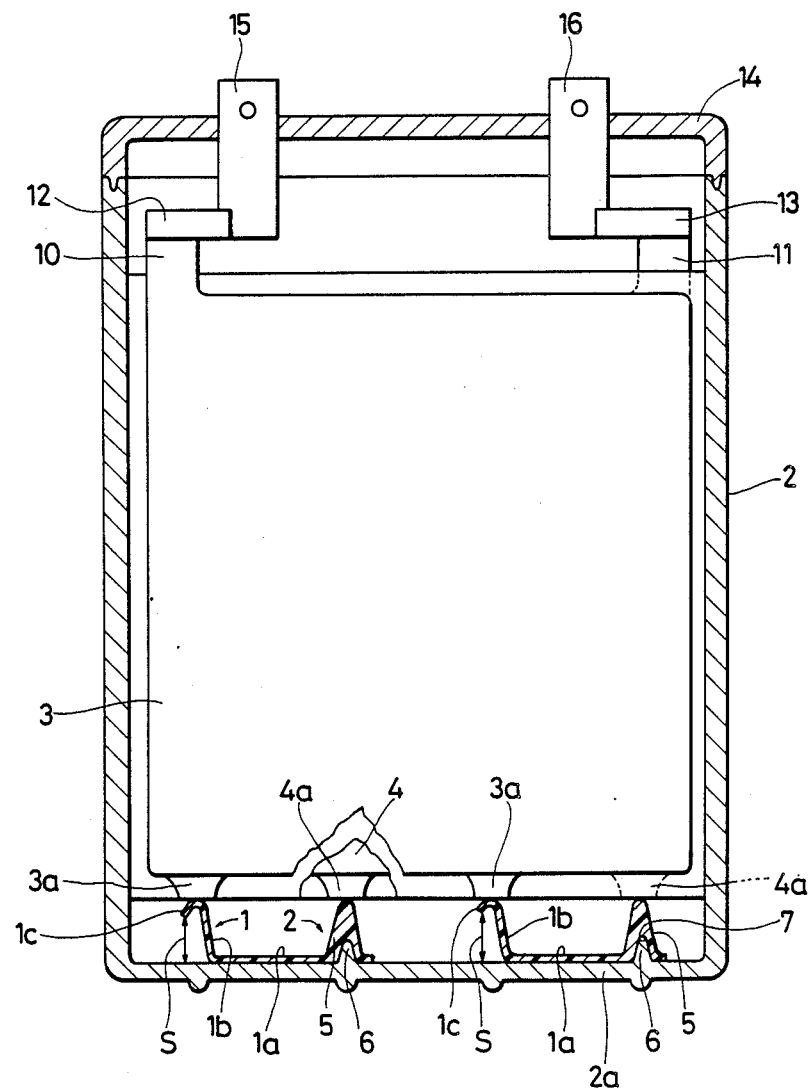
FIG. 2 is a cross-sectional view, partly omitted, of one embodiment of a battery container and a battery according to the present invention.

As shown in FIG. 2, the molded saddle are disposed at the left and right-hand positions on the inner bottom surface 2a of a battery container 2 and securedly attached thereto by bonding the horizontal base plate portions 1a to the bottom surface 2a with an adhesive or the like. When attached in the just-mentioned manner, a large vertical space S between the upper end portion 1c of the flexible raised plate portion 1b for supporting the positive plate's leg and the inner bottom surface 2a of the battery container 2. The upper end portion 1c of the flexible, raised support plate portion 1b is curved downwards circularly or squarely so as to ensure sufficient strength and to provide a support surface for the portion 1b which can support a leg of each positive electrode plate in a stable manner. For molding thereof, soft synthetic resin, such as polypropylene, is used as a raw material and is formed so as to have the raised support plate portion 1b made relatively thinner; thereby, providing the portion 1b with flexibility. Although a saddle for supporting negative plates can be integrally made with the battery container when the container is molded, it can also be integrally formed with the molded saddle 1 as shown in FIG. 1 instead of being integrally formed with the battery container. More specifically, the other end of the horizontal base plate portion 1a for supporting positive plates is extended to have a sectionally mountain-shaped and longitudinally extended support plate portion saddle 5 integrally formed therewith for supporting lined-up legs of negative electrode plates; thereby, forming a positive/negative plate-supporting molded saddle M.

The molded saddles are disposed at the predetermined left and right positions on the flat bottom surface of the battery container and bonded securely thereto to provide a battery container 2 carrying the positive/negative plate-supporting saddle of the present invention. The molded saddle for negative plates is made relatively thin and rigid and provided at its outer edge with a horizontally extended base plate 5a which is to be bonded to the inner bottom surface of the battery container to obtain a negative plate-supporting saddle 5 firmly fixed to the inner surface of the bottom of the battery container body 2. An engaging rib 6 may be provided on the inner bottom surface 2a of the container 2 while a corresponding engaging groove 7 may be provided on the lower surface of the negative plate-supporting saddle 5 so that the rib 6 is fitted into the groove 7 for providing an additional mechanical strength. Thus, a plate assembly made up of a group of positive plates 3 and negative plates 4 which are interleaved with separators is mounted on the molded saddle M in such a manner that each positive plate's leg 3a and each negative plate's leg 4a may be respectively placed on the molded saddles 1 and 5.

Figure 3:
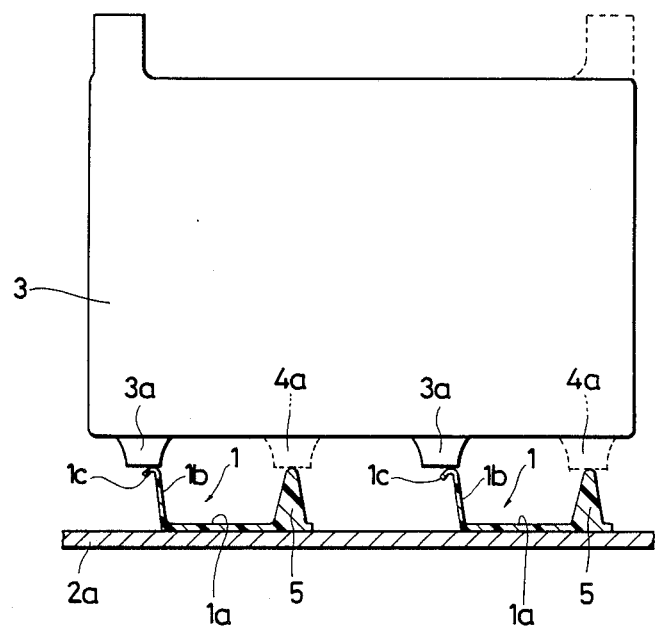
FIG. 3 is a cross-sectional view of a portion of a battery having a battery plate assembly and a molded saddle according to another embodiment of the present invention.
Figure 4:
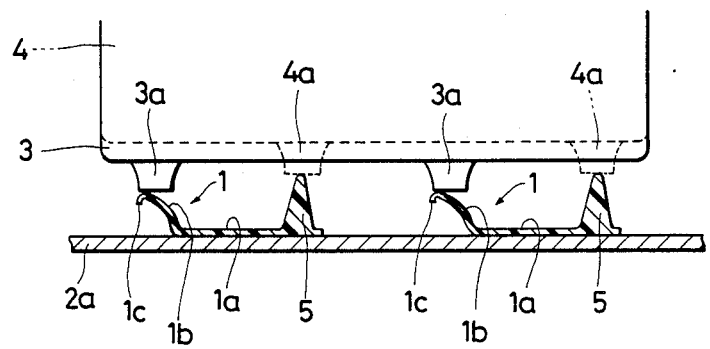
FIG. 4 is a cross-sectional view of a portion of a battery having a battery plate assembly and a molded saddle as in the embodiment shown in FIG. 3 when in use.

As shown in FIG. 2, each positive plate 3 is supported at the center portion of the lower end surface of its square leg 3a by the cantilever type flexible, raised support plate portion 1b of the positive plate-supporting saddle 1 and the negative plate 4 is supported at the center portion of the lower end surface of its square leg 4a by the sectionally mountain-shaped negative plate-supporting saddle 5. However, as shown in FIG. 3, it is preferable that the positive plate 3 be supported at a point biased toward one side on the lower end surface of its leg 3a by the curved upper end portion 1c of the flexible, raised support plate portion 1b. In this manner, when the positive plate 3 becomes extended, the upper end portion 1c of the flexible, raised support plate portion 1b bends downwards in response to the extension of the positive plate 3 so that it can keep the leg 3a supported on its back without slipping out of the lower end surface of the leg 3a, as shown in FIG. 4.

Figure 5:
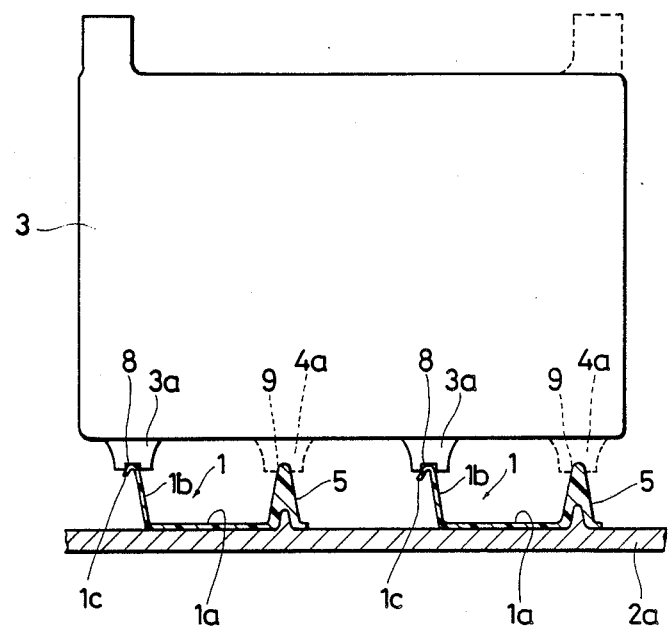
FIG. 5 is a cross-sectional view of a portion of a battery having a battery plate assembly and a molded saddle made according to a further embodiment of the present invention.
Figure 6:
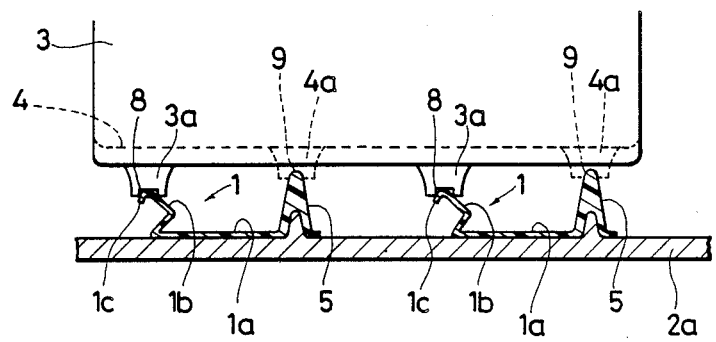
FIG. 6 is a cross-sectional view of a portion of a battery having a battery plate assembly and a molded saddle as in the embodiment shown in FIG. 5 when in use.

As shown in FIG. 5, the leg 3a of the positive plate 3 may be provided in its lower surface with an engaging groove 8 for receiving the upper end portion 1c of the flexible, raised support plate portion 1b which is fitted therein so that even when the raised support plate portion 1b is bent downwards to be deformed in response to the extension of the positive plate 3 as shown in FIG. 6, the leg 3a on the saddle 1 can be kept stable due to the engagement of the upper end portion 1c of the saddle 1 with the groove 8 in the leg 3a. The leg 4a of the negative plate 4 may also be provided with a similar engaging groove 9 if necessary. In FIG. 6, reference numerals 10 and 11 denote a positive tab and a negative tab, respectively, while reference numerals 12 and 13 designate a positive strap and a negative strap, respectively. Reference numeral 14 denotes a battery container lid, and numerals 15 and 16 represent a positive terminal and a negative terminal, respectively.

Figure 7:
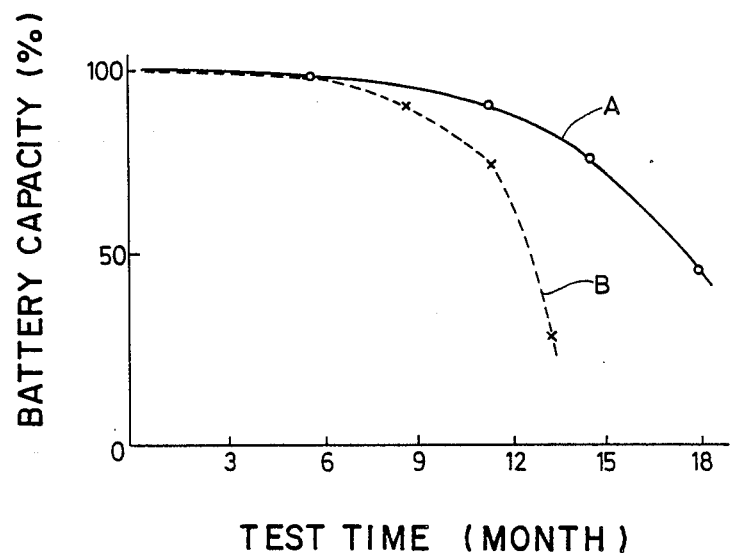
FIG. 7 is a graph showing the results of comparative life tests between the storage battery according to this invention and a conventional storage battery.

FIG. 7 shows service life characteristic curves obtained from the results of accelerated life tests performed at 60° C. on a battery equipped with the molded saddle of the present invention and on a conventional battery equipped with a conventional rigid saddle. More specifically, the accelerated life test was carried out in such a manner that at 60° C., the charge at 0.2 C was provided and when a battery voltage became 2.25 V, the constant-voltage charge of 2.25 V was continued for one month. Then, the battery was cooled to 25° C. and the discharge at 0.16 C was provided at 25° C. until the end point voltage thereof became 1.75 V. The capacity thereof at that time was then measured, and such a charge and discharge cycle was repeated. Thus, the resultant characteristic curves A and B between the battery of this invention and the conventional battery are as provided in FIG. 7. As clearly seen in FIG. 7, when compared to the conventional battery's curve B, curve A of the battery of this invention maintains a high battery capacity over a much longer period of time which proves that the life characteristic of the battery is improved by the saddle of this invention.

Thus, according to the present invention, the molded saddle for electrode plates of a storage battery has a horizontal base plate and a flexible, raised plate portion rising from one end of the horizontal base plate so that when the molded saddle is securely attached to the inner bottom surface of a storage battery container by bonding its horizontal base plate, there is a large, vertical space between the upper end portion of the flexible, raised plate portion and the inner bottom surface of the battery container. Consequently, the leg of a positive plate is supported on the upper end portion of the flexible, raised plate portion, and when the positive plate becomes expanded or extended, the flexible, raised plate portion is moved downwards in response to or in accordance with the extension of the positive plate in order to absorb the extension; thereby, preventing the positive plate from being warped. Accordingly, the capacity of the battery with the present invention's molded saddle can be kept at a high level over a longer period of time which results in the prolongation of the battery life. Furthermore, when the sectionally mountain-shaped support portion for legs of negative plates is formed integrally with the positive plate-supporting molded saddle, the disposition of the positive plate-supporting molded saddle and the negative plate-supporting molded saddle at the bottom surface of the battery container can be easily carried out which further contributes to bringing about a higher productivity of battery containers. In addition, when a plate assembly is placed into the battery container according to this invention in such a way that each of the legs of the positive plates may be supported by the flexible, raised plate portion for supporting the positive plate at a point biased toward one side, or when the upper end portion of the flexible, raised plate portion is fitted into the engaging groove provided in the lower end surface of each positive plate's leg, the engagement between the leg and the flexible, raised plate portion of the molded saddle can be retained in a stable and secure manner even under the condition whereby the flexible, raised plate portion is bent downwards in response to or according with the extension of the positive plate. The above-described structural arrangement guarantees effective and reliable performance of the saddle.

While the invention has been particularly shown and described in reference to preferred embodiments thereof, it will be understood by those skilled in the art that changes in form and details may be made therein without departing from the spirit and scope of the invention.

I claim:

1. A molded saddle for electrode plates of a storage battery being securely attached to the bottom surface of a battery container body, comprising:
    a horizontal base plate portion being fixed to the inner bottom surface of the battery container; and
    a flexible raised support plate portion for supporting legs of positive plates, said support plate portion rising upwards from one end of said horizontal base plate portion and having an upper end portion so as to form a large vertical space between said upper end portion and a horizontal plane being attached to said inner bottom surface of the battery container.

2. A molded saddle for electrode plates of a storage battery according to claim 1, wherein another end of said horizontal base plate is extended so as to have a sectionally mountain-shaped negative plate-supporting plate portion designed to support legs of negative plates and formed integrally with the base plate.

3. A storage battery, comprising a battery container; and at least one positive plate leg having a lower end surface in a plate assembly which is incorporated in said battery container, wherein said positive plate leg is supported on a flexible, raised support plate portion of a positive plate-supporting molded saddle having a horizontal base plate portion fixedly attached to the inner bottom surface of said container, wherein said support plate portion rises upwards from one end of said horizontal base plate portion and forms a substantially vertical space between said support plate portion and said horizontal base plate portion.

4. A storage battery as in claim 3, wherein the leg of each positive plate of a plate assembly has the lower end surface which is comprised of an engaging groove so that the upper end portion of the flexible, raised support plate portion for supporting positive plates can be fitted into said groove.

* * * * *